(12) United States Patent
Freemantle

(10) Patent No.: US 12,146,571 B2
(45) Date of Patent: Nov. 19, 2024

(54) HYDRAULIC TENSIONER

(71) Applicant: BORGWARNER INC., Auburn Hills, MI (US)

(72) Inventor: Paul Freemantle, Lansing, NY (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 18/247,290

(22) PCT Filed: Oct. 5, 2020

(86) PCT No.: PCT/US2020/054276
§ 371 (c)(1),
(2) Date: Mar. 30, 2023

(87) PCT Pub. No.: WO2022/075967
PCT Pub. Date: Apr. 14, 2022

(65) Prior Publication Data
US 2023/0407945 A1    Dec. 21, 2023

(51) Int. Cl.
*F16H 7/08* (2006.01)

(52) U.S. Cl.
CPC ... *F16H 7/0834* (2013.01); *F16H 2007/0806* (2013.01); *F16H 2007/0812* (2013.01); *F16H 2007/0859* (2013.01)

(58) Field of Classification Search
CPC ........... F16H 7/0834; F16H 2007/0806; F16H 2007/0812; F16H 2007/0859; F16H 7/08
USPC ......................................................... 474/101
See application file for complete search history.

(56) References Cited

U.S. PATENT DOCUMENTS

| | | | | |
|---|---|---|---|---|
| 5,785,619 A | * | 7/1998 | Nakakubo | F16H 7/08 474/138 |
| 6,361,458 B1 | | 3/2002 | Smith | |
| 2008/0318718 A1 | * | 12/2008 | Namie | F16H 7/0848 474/110 |
| 2016/0084359 A1 | * | 3/2016 | Wigsten | F16H 7/0848 474/110 |
| 2019/0316658 A1 | * | 10/2019 | Sun | F16H 7/08 |

FOREIGN PATENT DOCUMENTS

| | | | | |
|---|---|---|---|---|
| EP | 1448914 B1 | * | 4/2008 | ............ F16H 7/08 |
| JP | 2016509185 A | | 3/2016 | |
| JP | 2020133647 A | | 8/2020 | |

\* cited by examiner

*Primary Examiner* — Michael A Riegelman
(74) *Attorney, Agent, or Firm* — Brown & Michaels, PC

(57) ABSTRACT

A hydraulic tensioner having a piston sliding around an outside surface of a pin or rod, so that the high pressure chamber for chain control is created by the area between the piston internal diameter and the rod outside diameter. A spring around the outside of the rod presses against the bottom of the piston, biasing the piston outward during low oil pressure conditions. Preferably, the piston is steel and the rod is aluminum, the reverse of prior art designs, which means that as temperature increases, the piston to bore clearance reduces. This can offset the oil viscosity reduction and maintain the same performance over operating temperatures.

8 Claims, 3 Drawing Sheets

HYDRAULIC TENSIONER

BACKGROUND OF THE INVENTION

Field of the Invention

The invention pertains to the field of tensioners for chains or belts. More particularly, the invention pertains to hydraulic tensioners.

Description of Related Art

Most current automotive hydraulic tensioners use a piston that fits into an internal bore in a tensioner body. High pressure oil in the bore biases the piston outward against an arm, providing tension to control a chain or belt drive timing system. Typically, the piston is aluminum and the body is steel.

Many prior art tensioner designs have a piston to bore clearance that increases when oil temperatures in the engine rise, due to the difference in thermal expansion coefficients between steel and aluminum. This, combined with viscosity reduction of the oil with temperature, means the performance of the tensioner changes with temperature, which is not desirable.

SUMMARY OF THE INVENTION

A hydraulic tensioner having a piston sliding around an outside surface of a pin or rod, so that the high pressure chamber for chain control is created by the area between the piston internal diameter and the rod outside diameter. A spring around the outside of the rod presses against the bottom of the piston, biasing the piston outward during low or zero oil pressure conditions. Preferably, the piston is steel and the rod is aluminum, the reverse of prior art designs, which means that as temperature increases, the piston to bore clearance reduces. This can offset the oil viscosity reduction and maintain the same performance over operating temperatures.

DETAILED DESCRIPTION OF THE INVENTION

Figure 1:
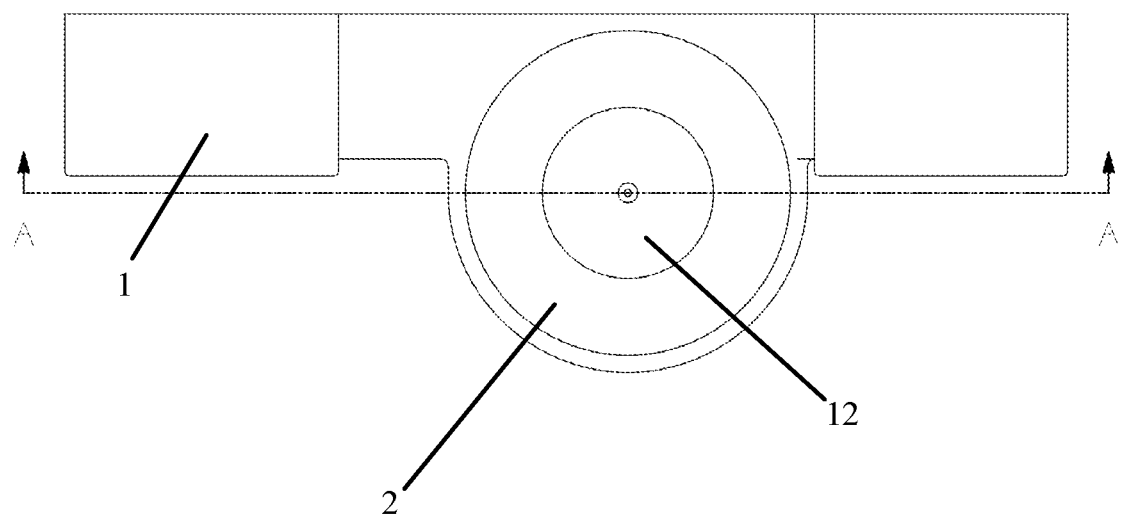
FIG. 1 shows a top view of a tensioner of an embodiment of the present invention.
Figure 2:
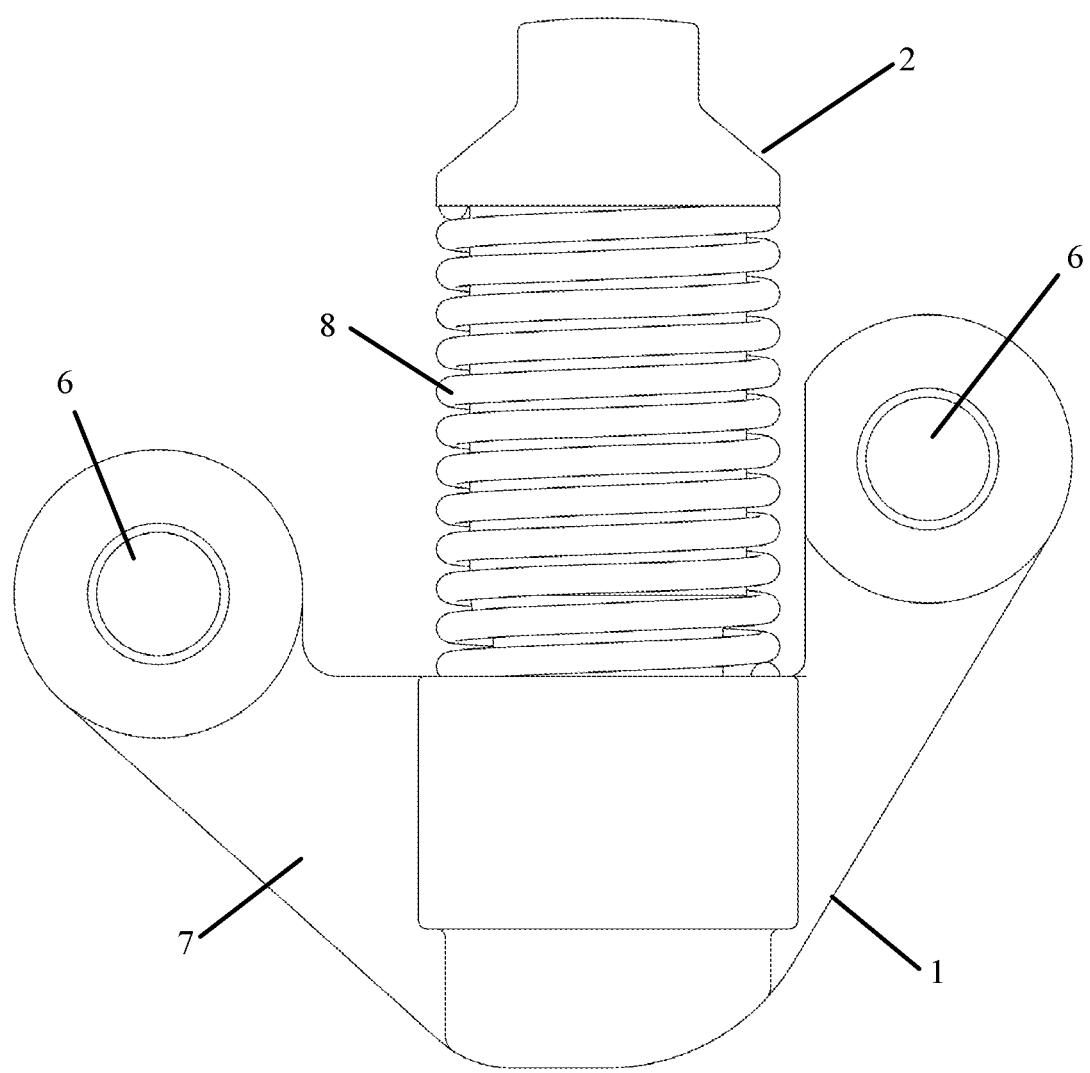
FIG. 2 shows schematic of a tensioner of an embodiment of the present invention.
Figure 3:
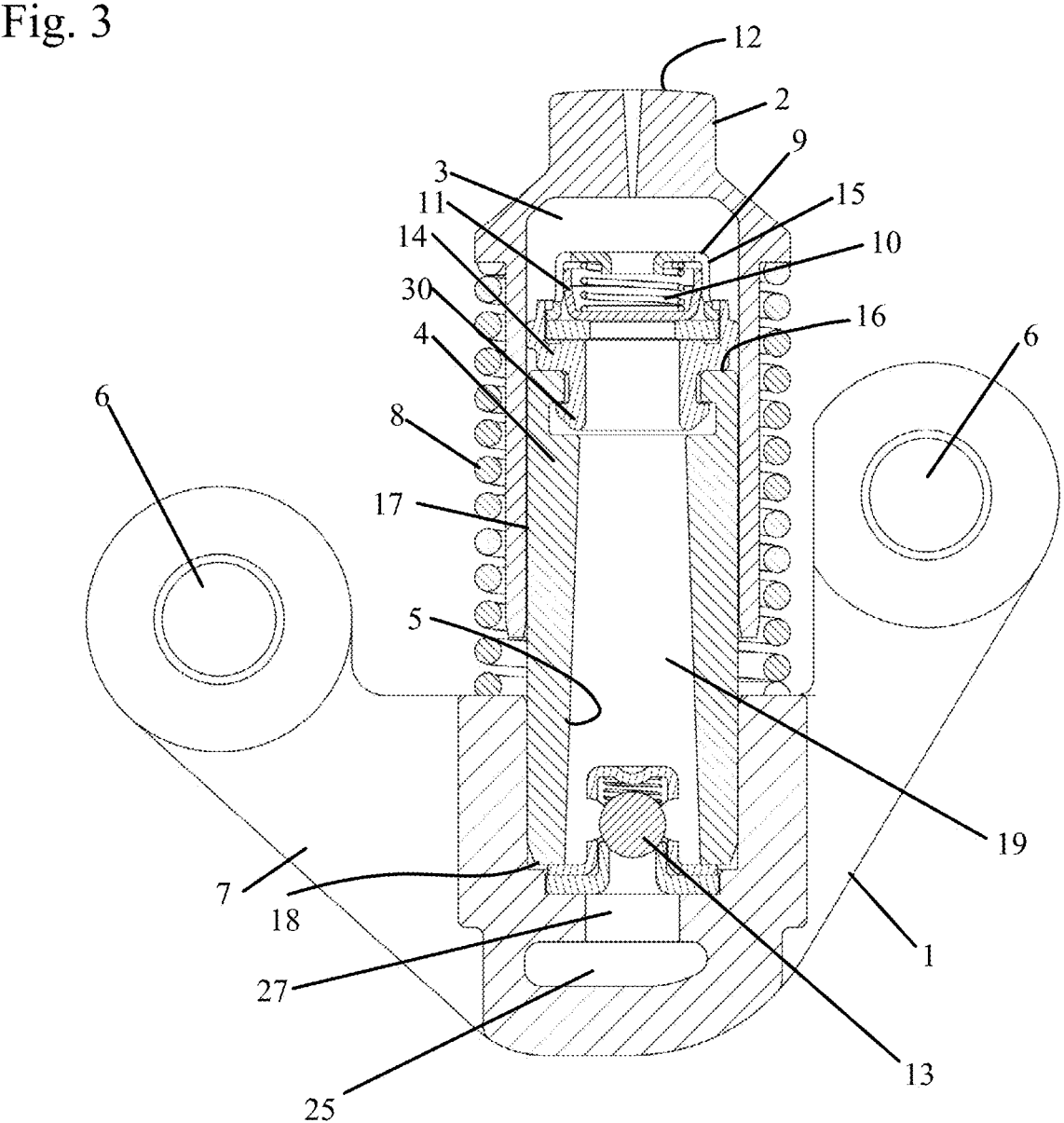
FIG. 3 shows a sectional view of the tensioner along line A-A of FIG. 1.

Referring to FIGS. 1-3, an improved hydraulic tensioner has a body 1, preferably made of aluminum although other materials are possible. The body 1 allows the tensioner to be bolted to an engine in the same way it is done today, for example using bolts through holes 6 in mounting ears 7. The body 1 could be extruded, die cast, machined from a blank, or made by other means known to the art.

A hollow pin, tube or rod 4 is affixed to the body 1, for example by having a first end 18 of the rod 4 press-fit or using a screw thread into the body 1. The rod 4 has an internal bore 5 which is in fluid communication with an oil supply 25 from an engine and discussed in further detailed below. The rod 4 is made from die cast aluminum, or from other materials and by other methods as required. Optionally, the tensioner could be formed with a single piece body 1 and rod 4 design. An outer surface 17 of the rod 4 creates a sliding surface for a piston 2.

Piston 2 is slidably received over rod 4. The piston 2 is made from steel, although aluminum or other materials are possible. An outer end 12 of the piston 2 is preferably located to press against an arm in a timing system to tension a timing chain or belt (not shown).

Forming the rod 4 of aluminum and the piston 2 of steel reduces clearance as temperature increases.

A low pressure chamber (LPC) 19 is created in the internal bore 5 of the rod 4.

A high pressure chamber (HPC) 3 is formed between the outer surface 17 and a second end 16 of the rod 4, and an inside bore 2a of the piston 2. A first check valve 15 is present within the HPC 3 between the rod 4 and the inside bore 2a of the piston 2 which allows oil to flow into the HPC 3, but not out. The first check valve 15 could be of a variety of designs, for example a ball check valve or a disk style valve. In the design shown in FIG. 1, the first check valve 15 has a body 9 and a check element 11, which is biased by an internal spring 10, as is known to the art. The first check valve 15 can be made from different materials as needed, for example, steel or plastic. The first check valve 15 can optionally be attached via a clip 30 of the seal 14 to the top of rod 4 at the second end 16. The seal 14 could also be used to seal the piston 2 around the rod 4 so as to not allow oil to flow between the aluminum rod 4 and the steel piston 2. The first check valve 15 and seal 14 can act as an anti-ejection feature if necessary.

A small hole in the check valve 15 (not shown) could be provided to allow for oil flow and subsequent "tuning" of the tensioner stiffness. The tuning could be also be achieved by a tortuous path in a plastic seal (not shown).

An external spring 8 creates a bias to allow the piston 2 to extend and remain extended when oil pressure is not present. By having a spring 8 external to the piston 2, there is less design constraint for load/rate. Furthermore, mounting the spring 8 on the outside of the rod 4 allows for a bigger diameter spring to be used, which can reduce stress and reduce the spring rate, making less spring load variation between new and worn chain.

An optional second check valve 13 can be provided in the first end 18 of the rod 4. The second check valve 13 controls flow into the LPC 19 from the engine oil supply in the back of the tensioner through the inlet hole 25 and oil supply 27, capturing the oil in the LPC 19 for applications where the piston 2 is "nose up" and oil could drain once the engine was turned off. The subsequent oil reservoir in the LPC 19 can be called upon during the next engine start up to prevent start up noise and increase chain control during cranking and the first revolutions of the engine.

Oil from the oil supply 25 flows through the oil inlet line 27 to the LPC 19. In one embodiment, fluid flows through the oil inlet line 27, through the second check valve 13 and into the LPC 19. The second check valve 13 aids in capturing the oil when the tensioner and the piston are installed "nose-up" in the engine. Alternatively, oil flows directly from the oil supply to the LPC 19.

From the LPC 19, fluid can flow through the first check valve 15 and into the HPC 3 when the force of the fluid is greater than the force of the fluid present in the HPC 3. Once the outer end 12 of the piston 2 receives pressure from the belt or chain via a tensioner arm, the piston 2 compresses spring 8, and fluid is prevented from exiting the HPC 3 by the first check valve 15.

The first check valve 15 separates the LPC 19 from the HPC 3. In one embodiment, the second check valve 13 aids in retaining oil in the LPC 19 once the engine is switched off an oil drains away from the oil supply 25 in the engine, allowing for instant oil volume once the engine is restarted.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner comprising:
    a) a body;
    b) a rod having a first end affixed to the body, a second end, an inner bore forming a low pressure chamber, and an outer surface;
    c) a piston having an inner end, an outer end, and an inner bore slidably fitted around the outer surface of the rod, the inner bore of the piston and the second end of the rod forming a high pressure chamber;
    d) a first check valve mounted to the second end of the rod, controlling flow between the high pressure chamber and the low pressure chamber;
    e) a seal for the high pressure chamber on the second end of the rod, sealing to the inner bore of the piston between the first check valve and the second end of the rod, clipping to the second end of the rod;
    f) an external spring mounted around the outer surface of the rod and an outer surface of the piston between the inner end of the piston and the body, providing a force between the body and the inner end of the piston, biasing the piston outwardly relative to the body.

2. The hydraulic tensioner of claim 1, in which the first end of the rod is press-fit into the body.

3. The hydraulic tensioner of claim 1, in which the first end of the rod formed integrally with the body.

4. The hydraulic tensioner of claim 1, in which the rod is formed of aluminum.

5. The hydraulic tensioner of claim 1, in which the piston is formed of steel.

6. The hydraulic tensioner of claim 1, further comprising a second check valve located at the first end of the rod, controlling flow from the low pressure chamber.

7. The hydraulic tensioner of claim 1, in which the first check valve is formed of plastic.

8. The hydraulic tensioner of claim 1, in which the first check valve is formed of steel.

* * * * *